United States Patent
Su et al.

(10) Patent No.: US 10,527,922 B2
(45) Date of Patent: Jan. 7, 2020

(54) PROJECTION SCREEN AND LIGHT ABSORBING FILM

(71) Applicant: Nano Precision Taiwan Limited, Hsinchu County (TW)

(72) Inventors: Fang-Hsuan Su, Hsin-Chu (TW); Fu-Chiang Hsu, Hsin-Chu (TW); Wan-Jung Li, Hsin-Chu (TW); Shih-Yuan Liu, Hsin-Chu (TW); Chia-Hua Chen, Hsin-Chu (TW); Chi-Tang Hsieh, Hsin-Chu (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 0 days.

(21) Appl. No.: 16/212,640

(22) Filed: Dec. 6, 2018

(65) Prior Publication Data
US 2019/0187549 A1    Jun. 20, 2019

(30) Foreign Application Priority Data
Dec. 14, 2017 (CN) .......................... 2017 1 1337907

(51) Int. Cl.
*G03B 21/62* (2014.01)
*G02B 5/00* (2006.01)
(Continued)

(52) U.S. Cl.
CPC ............. *G03B 21/62* (2013.01); *G02B 5/003* (2013.01); *G03B 21/60* (2013.01); *G03B 21/602* (2013.01); *G03B 21/625* (2013.01)

(58) Field of Classification Search
CPC .................................................... G02B 5/003
(Continued)

(56) References Cited

U.S. PATENT DOCUMENTS 1,942,841 A * 1/1934 Takeo ........................ F21V 5/04
340/815.41
4,083,626 A * 4/1978 Miyahara ............. G03B 21/602
359/453
(Continued)

FOREIGN PATENT DOCUMENTS

CN          203759584          8/2014
CN          205427425          8/2016
(Continued)

OTHER PUBLICATIONS

"Office Action of Taiwan Counterpart Application," dated Jul. 15, 2019, p. 1-5.

*Primary Examiner* — Clayton E. LaBalle
*Assistant Examiner* — Kevin C Butler
(74) *Attorney, Agent, or Firm* — JCIPRNET

(57) ABSTRACT

A projection screen including a light absorbing film and a projection film is provided. The light absorbing film includes a transparent layer and a plurality of light absorbing microstructures, where the light absorbing microstructures are embedded in the transparent layer and arranged at intervals, each of the light absorbing microstructures is asymmetrical to a reference plane, the transparent layer has two surfaces opposite to each other, and the reference plane passes through a geometric center of each of the light absorbing microstructures and is parallel to each of the surfaces, and there is a space between each of the light absorbing microstructures and each of the surfaces. The projection film and the light absorbing film are stacked on each other. A light absorbing film is also provided, and the projections screen and the light absorbing film have good optical quality.

18 Claims, 7 Drawing Sheets

(51) Int. Cl.
  *G03B 21/602* (2014.01)
  *G03B 21/625* (2014.01)
  *G03B 21/60* (2014.01)

(58) Field of Classification Search
  USPC .......................................................... 359/455
  See application file for complete search history.

(56) References Cited

U.S. PATENT DOCUMENTS

| | | | | |
|---|---|---|---|---|
| 4,621,898 A | * | 11/1986 | Cohen | G02B 5/22 |
| | | | | 359/601 |
| 2001/0005282 A1 | * | 6/2001 | Etori | G03B 21/62 |
| | | | | 359/453 |
| 2005/0180002 A1 | * | 8/2005 | Ohsako | G03B 21/56 |
| | | | | 359/449 |
| 2005/0180003 A1 | * | 8/2005 | Toda | B82Y 20/00 |
| | | | | 359/452 |
| 2006/0061868 A1 | * | 3/2006 | Hattori | G02B 1/11 |
| | | | | 359/603 |
| 2010/0171929 A1 | * | 7/2010 | Liu | G03B 21/56 |
| | | | | 353/29 |
| 2010/0189956 A1 | * | 7/2010 | Etori | G02B 1/11 |
| | | | | 428/141 |
| 2010/0328777 A1 | * | 12/2010 | Kashiwagi | G02B 5/003 |
| | | | | 359/614 |
| 2016/0124126 A1 | * | 5/2016 | Vasylyev | G02B 5/003 |
| | | | | 359/893 |

FOREIGN PATENT DOCUMENTS

| | | | | |
|---|---|---|---|---|
| TW | M347594 | | 12/2008 | |
| TW | 200900842 | * | 1/2009 | G02B 1/02 |

* cited by examiner

PROJECTION SCREEN AND LIGHT ABSORBING FILM

CROSS-REFERENCE TO RELATED APPLICATION

This application claims the priority benefit of China application serial no. 201711337907.7, filed on Dec. 14, 2017. The entirety of the above-mentioned patent application is hereby incorporated by reference herein and made a part of this specification.

BACKGROUND OF THE INVENTION

Field of the Invention

The invention relates to a projection screen and a light absorbing film, and particularly relates to a projection screen and a light absorbing film of a rear projection projector.

Description of Related Art

An image contrast and clarity of a display device (for example, a liquid crystal display, a projection screen, etc.) may be decreased due to an environmental light (such as an indoor light or an outdoor natural light), in particular, a degree of affection on the projection screen is the most. Regarding the projection screen, a black anti-glare (AG) layer or anti-reflection (AR) layer is generally applied to mitigate the influence of the environmental light on the image contrast and clarity. However, according to such method, while the influence of the environmental light is mitigated, a projection light is also sacrificed, which worsens transparency of the projection screen.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projection screen and a light absorbing film, which do not excessively absorb a projection light, such that the projection screen has a good transparency.

Other objects and advantages of the invention can be further illustrated by the technical features broadly embodied and described as follows.

In order to achieve one or a portion of or all of the objects or other objects, an embodiment of the invention provides a projection screen including a light absorbing film and a projection film. The light absorbing film includes a transparent layer and a plurality of light absorbing microstructures, where the light absorbing microstructures are embedded in the transparent layer and arranged at intervals, each of the light absorbing microstructures is asymmetrical to a reference plane, the transparent layer has two surfaces opposite to each other, and the reference plane passes through a geometric center of each of the light absorbing microstructures and is parallel to each of the surfaces, and there is a space between each of the light absorbing microstructures and each of the surfaces. The projection film and the light absorbing film are stacked on each other.

In order to achieve one or a portion of or all of the objects or other objects, an embodiment of the invention provides a light absorbing film including a transparent layer and a plurality of light absorbing microstructures. The light absorbing microstructures are embedded in the transparent layer and arranged at intervals, where each of the light absorbing microstructures is asymmetrical to a reference plane, the transparent layer has two surfaces opposite to each other, the reference plane passes through a geometric center of each of the light absorbing microstructures and is parallel to each of the surfaces, and there is a space between each of the light absorbing microstructures and each of the surfaces.

According to the above description, the embodiments of the invention have at least one of the following advantages or effects. The light absorbing microstructures embedded in the transparent layer are adapted to absorb an environmental light to avoid a situation that an image contrast and clarity of an image projected on the projection screen are decreased due to the environmental light. Moreover, the light absorbing microstructures are embedded in the transparent layer other than being disposed on the surface of the transparent layer, and there is a space between each of the light absorbing microstructures and each of the surfaces of the transparent layer, so that an excessive difference between refractive indexes of a light incident side and a light emitting side of the light absorbing film due to configuration of the light absorbing microstructures is avoided, so as to maintain the quality of a projection image. Moreover, the light absorbing microstructures are arranged at intervals without being comprehensively configured, such that the light absorbing microstructures are avoided to excessively absorb the projection light, and the situation that the light absorbing microstructures worsen the transparency of the projection screen is avoided.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
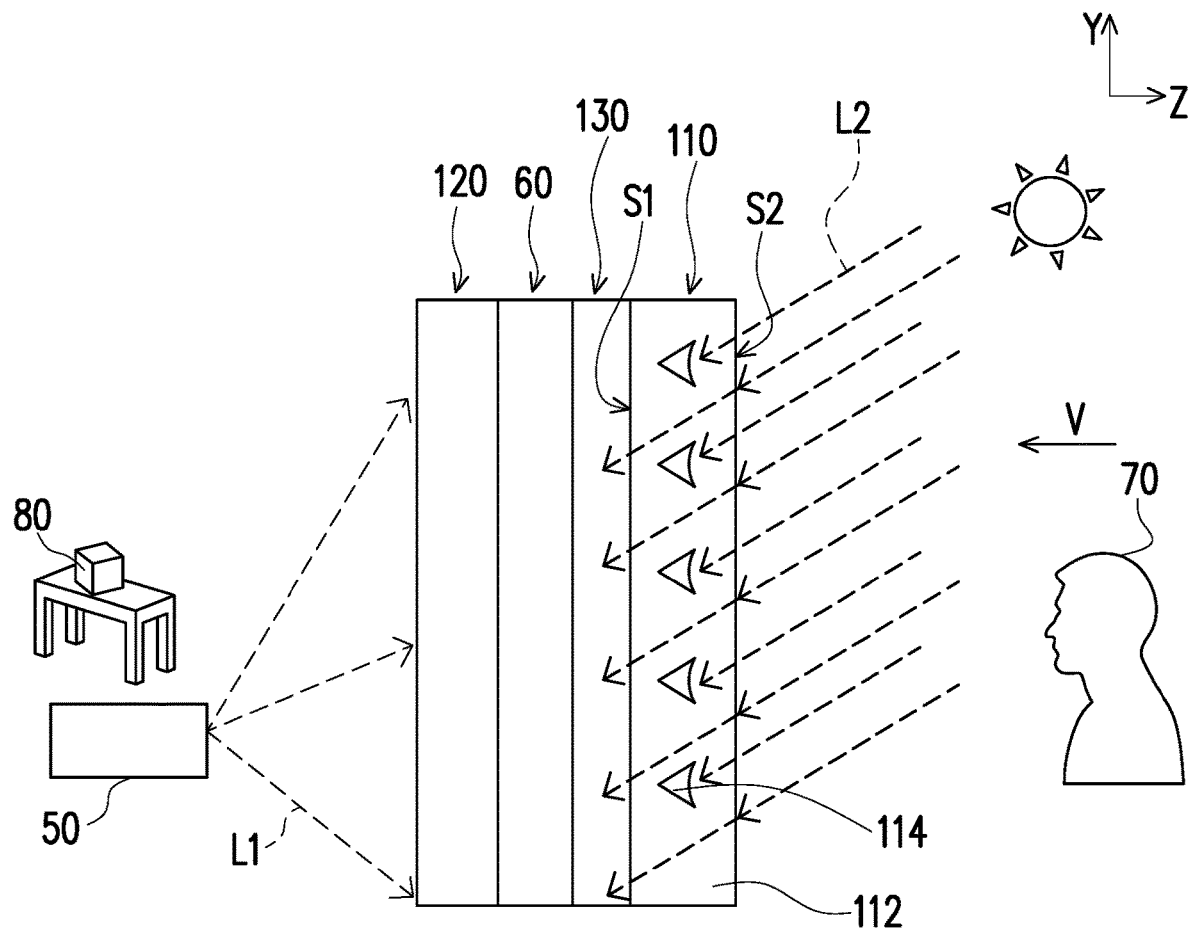
FIG. 1 is a schematic diagram of a light absorbing film according to an embodiment of the invention.

FIG. 1 is a schematic diagram of a light absorbing film according to an embodiment of the invention. Referring to FIG. 1, in the embodiment, the light absorbing film 110 is applied to a projection film 120 and a rear projection projector 50. The light absorbing film 110 and the projection film 120 are stacked on each other. In the embodiment, the projection film 120 is connected to a material with imaging ability, for example, glass, acrylic, polymer-dispersed liquid crystal (PDLC). In the embodiment, the projection film 120 is, for example, adhered to one side of a piece of glass 60 of an exhibition window (for example, a left side of the glass 60 in FIG. 1). In the embedment, the light absorbing film 110 is carried by a transparent substrate 130, and is adhered to another side of the glass 60 (for example, a right side of the glass 60 in FIG. 1) through the transparent substrate 130. The light absorbing film 110 is, for example, a transparent light absorbing film (or referred to as a transmissive light absorbing film), and includes a transparent layer 112 and a plurality of light absorbing microstructures 114. However, in an embodiment that is not illustrated, the transparent substrate may also be a part of the light absorbing film, i.e. the light absorbing film includes the transparent substrate, and the transparent layer 112 and the projection film 120 are respectively connected to two opposite sides of the transparent substrate, where the projection film 120 is, for example, connected to the transparent substrate through the glass 60, though the invention is not limited thereto. However, in other embodiment that is not illustrated, the light absorbing film may not include the transparent substrate, which is not limited by the invention.

Figure 2:
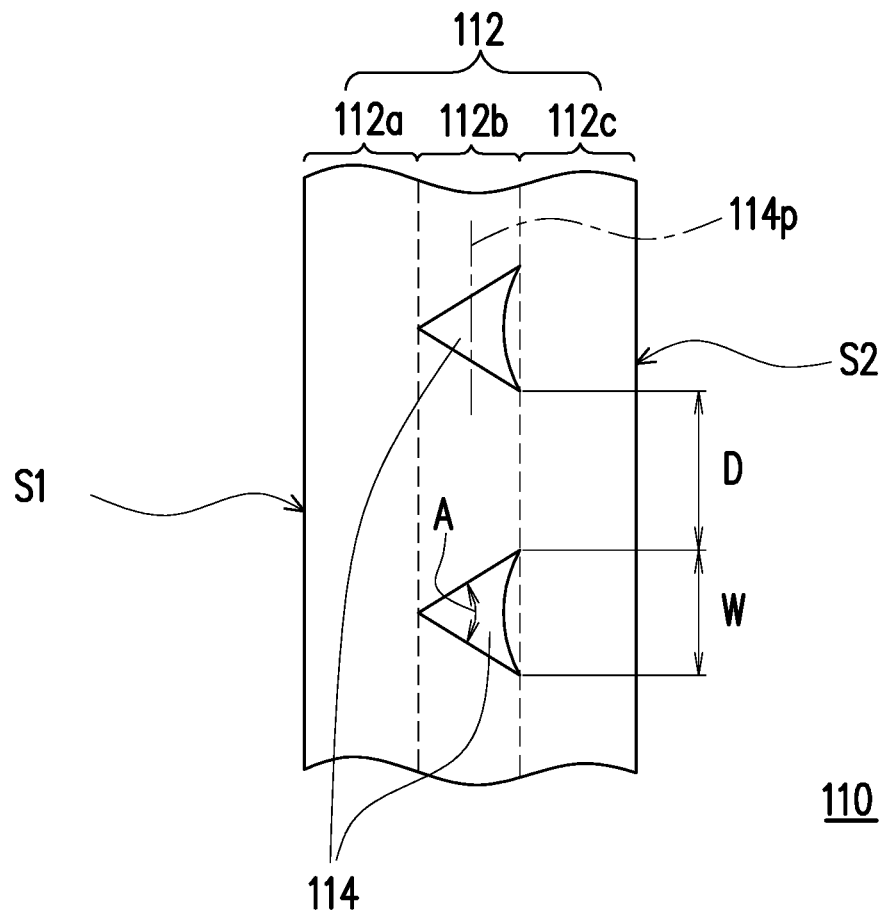
FIG. 2 is a partial schematic diagram of the light absorbing film of FIG. 1.

The light absorbing microstructures 114 are embedded in the transparent layer 112, and are arranged at intervals. In the embodiment, each of the light absorbing microstructures 114 is asymmetrical to a reference plane 114$p$, i.e. each of the light absorbing microstructures 114 presents a left-right asymmetric shape as that shown in FIG. 2. Moreover, in the embodiment, the reference plane 114$p$ in FIG. 2 is, for example, a vertical plane, each of the light absorbing microstructures 114 is, for example, parallel to a horizontal plane in FIG. 2, i.e. each of the light absorbing microstructures 114 is, for example, parallel to the horizontal plane perpendicular to the reference plane 114$p$, i.e. each of the light absorbing microstructures 114 presents an up-down symmetric shape as that shown in FIG. 2. The reference plane 114$p$ passes through a geometric center of each of the light absorbing microstructures 114. In the embodiment, the transparent layer 112 has a first surface S1 and a second surface S2 opposite to each other, and the reference plane 114$p$ is parallel to the first surface S1 and the second surface S2. There is a space between each of the light absorbing microstructures 114 and the first surface S1, and there is a space between each of the light absorbing microstructures 114 and the second surface S2. The projection film 120 is, for example, a transparent projection film (or referred to as a transmissive projection film). The projection film 120 is located between the light absorbing film 110 and the rear projection projector 50, and a projection light L1 emitted by the rear projection projector 50 is projected to the projection film 120, and is viewed by a user 70 through the light absorbing film 110. In the embodiment, a material of each of the light absorbing microstructures 114 is, for example, polymer, though the invention is not limited thereto.

Under the above configuration, the light absorbing microstructures 114 embedded in the transparent layer 112 may absorb an environmental light L2 (for example, the sunlight), so as to avoid a situation that image contrast and clarity of an image projected on the projection film 120 are decreased due to the environmental light L2. Moreover, the light absorbing microstructures 114 are embedded in the transparent layer 112 other than being disposed on the first surface S1 and the second surface S2 of the transparent layer 112. In the embodiment, there are spaces between the light absorbing microstructures 114 and the first surface S1 of the transparent layer 112 and between the light absorbing microstructures 114 and the second surface S2 of the transparent layer 112, so that an excessive difference between refractive indexes of a light incident side and a light emitting side of the light absorbing film 110 (the difference of the refractive indexes of the first surface Si and the second surface S2) due to configuration of the light absorbing microstructures 114 is avoided, so as to maintain the quality of a projection image.

FIG. 2 is a partial schematic diagram of the light absorbing film of FIG. 1. Referring to FIG. 2, to be specific, the transparent layer 112 of the embodiment includes a first block 112$a$, a second block 112$b$ and a third block 112$c$. In the embodiment, the first block 112$a$ is located between the first surface S1 and the second block 112$b$, the third block 112$c$ is located between the second block 112$b$ and the second surface S2, the second block 112$b$ is located between the first block 112$a$ and the third block 112$c$, and the light absorbing microstructures 114 are embedded in the second block 112$b$. In an embodiment, materials of the first block 112$a$ and the third block 112$c$ may be the same. In an embodiment, a refractive index of the first block 112$a$ is equal to a refractive index of the third block 112$c$. In an embodiment, a difference between the refractive index of the first block 112$a$ and the refractive index of the third block 112c is, for example, less than or equal to 0.01. In an embodiment, the difference between the refractive index of the first block 112a and the refractive index of the third block 112c is, for example, less than or equal to 0.1.

On the other hand, in the embodiment, the light absorbing microstructures 114 are arranged at intervals other than being comprehensively configured, such that the situation that the light absorbing microstructures 114 excessively absorb the projection light L1 is avoided, and the situation that the light absorbing microstructures 114 worsen the transparency of the projection film 120 is avoided. Namely, the projection film 120 may have a high transparency, and when an exhibited article 80 and the rear projection projector 50 are located at a same side of the projection film 120 (for example, the left side of the projection film 120 of FIG. 1), the user 70 may still view the exhibited article 80 through the projection film 120 at another side of the projection film 120 (for example, the right side of the projection film 120 of FIG. 1), i.e. the projection film 120 allows the user to clearly view the exhibited article 80 and the projection image simultaneously. In other embodiment, the light absorbing film 110 may also be applied to other display techniques, for example, the light absorbing film 110 may be attached to a display surface of a flat panel display device, for example, a display surface of a PDLC display, which is not limited by the invention.

In the embodiment, each of the light absorbing microstructures 114, for example, has a black color, so as to achieve an effect of absorbing light, though the invention is not limited thereto. In other embodiment, the light absorbing microstructures 114 may have a grey color or any other color. Moreover, by adjusting the spaces between the light absorbing microstructures 114, a light transmittance of the light absorbing film 110 may be greater than or equal to 50%, though the invention is not limited thereto. In this way, the light absorbing film 110 may have both good light absorption capability and good light transmission capability. To be specific, a width W of each of the light absorbing microstructures 114 is, for example, greater than or equal to 5 μm, and a distance D between adjacent two light absorbing microstructures 114 is, for example, greater than or equal to 0.5 times the width W of each of the light absorbing microstructures 114 (i.e. D≥0.5W), and an angle A of a tip of each of the light absorbing microstructures 114 is between 3 degrees and 120 degrees, though the invention is not limited thereto.

In the embodiment, each of the light absorbing microstructures 114 has a first end (for example, a left end of the light absorbing microstructure 114 shown in FIG. 1 and FIG. 2) and a second end (for example, a right end of the light absorbing microstructure 114 shown in FIG. 1 and FIG. 2) opposite to each other, where the first end faces the projection film 120, and a width of the first end is less than a width of the second end. In this way, regarding the projection light L1 projected to the light absorbing film 110 from the first surface S1, the light absorbing film 110 has a larger aperture ratio. In other embodiments, the width of the first end of each of the light absorbing microstructures 114 may also be greater than the width of the second end, which is not limited by the invention.

Figure 3:
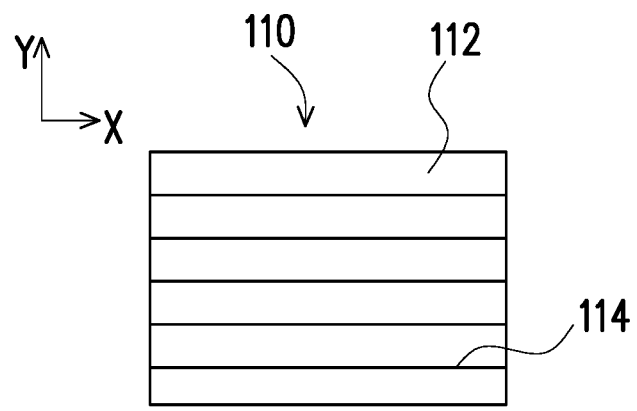
FIG. 3 is a schematic diagram of the light absorbing film of FIG. 1 viewing along a viewing angle V.
Figure 4A:
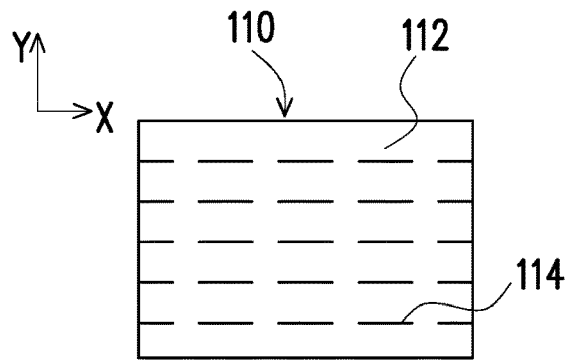
FIG. 4A to FIG. 4D are schematic diagrams of the light absorbing film according to other embodiments of the invention.
Figure 4B:
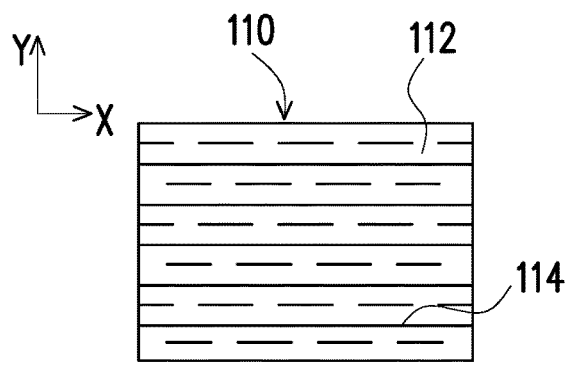
Figure 4C:
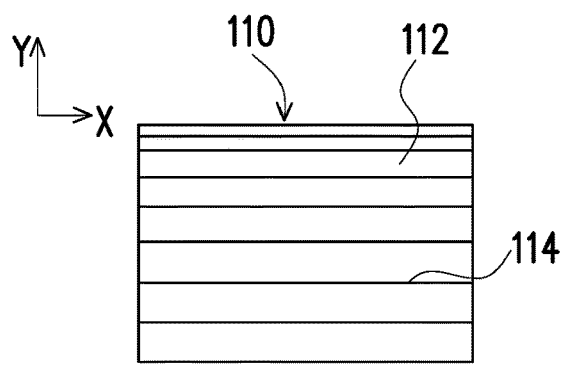
Figure 4D:
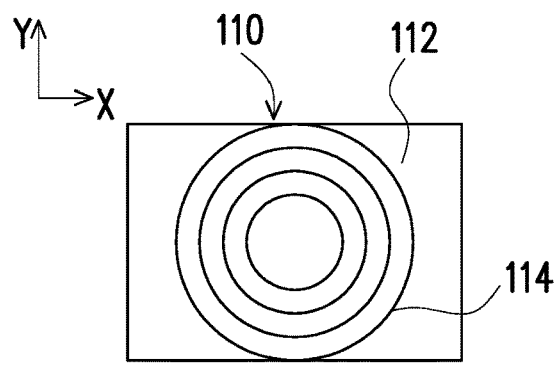

FIG. 3 is a schematic diagram of the light absorbing film of FIG. 1 viewing along a viewing angle V. As shown in FIG. 3, the light absorbing microstructures 114 are continuously arranged along a horizontal direction X, and are arranged in equal intervals along a vertical direction Y. However, distribution methods of the light absorbing microstructures 114 are not limited by the invention, and are described below with reference of figures. FIG. 4A to FIG. 4D are schematic diagrams of the light absorbing film according to other embodiments of the invention. Referring to FIG. 4A, the light absorbing microstructures 114 are arranged in equal intervals along the horizontal direction X, and are arranged in equal intervals along the vertical direction Y. As shown in FIG. 4B, a part of the light absorbing microstructures 114 is arranged in equal intervals along the horizontal direction X, another part of the light absorbing microstructures 114 is continuously arranged along the horizontal direction X, and the light absorbing microstructures 114 are arranged in equal intervals along the vertical direction Y. As shown in FIG. 4C, the light absorbing microstructures 114 are continuously arranged along the horizontal direction X, and are arranged in unequal intervals along the vertical direction Y, where the intervals are gradually decreased along the vertical direction Y. As shown in FIG. 4D, the light absorbing microstructures 114 are arranged in concentric circles in form of a Fresnel lens. However, the arrangement method of the light absorbing microstructures 114 are still not limited to the above arrangement methods.

Figure 5:
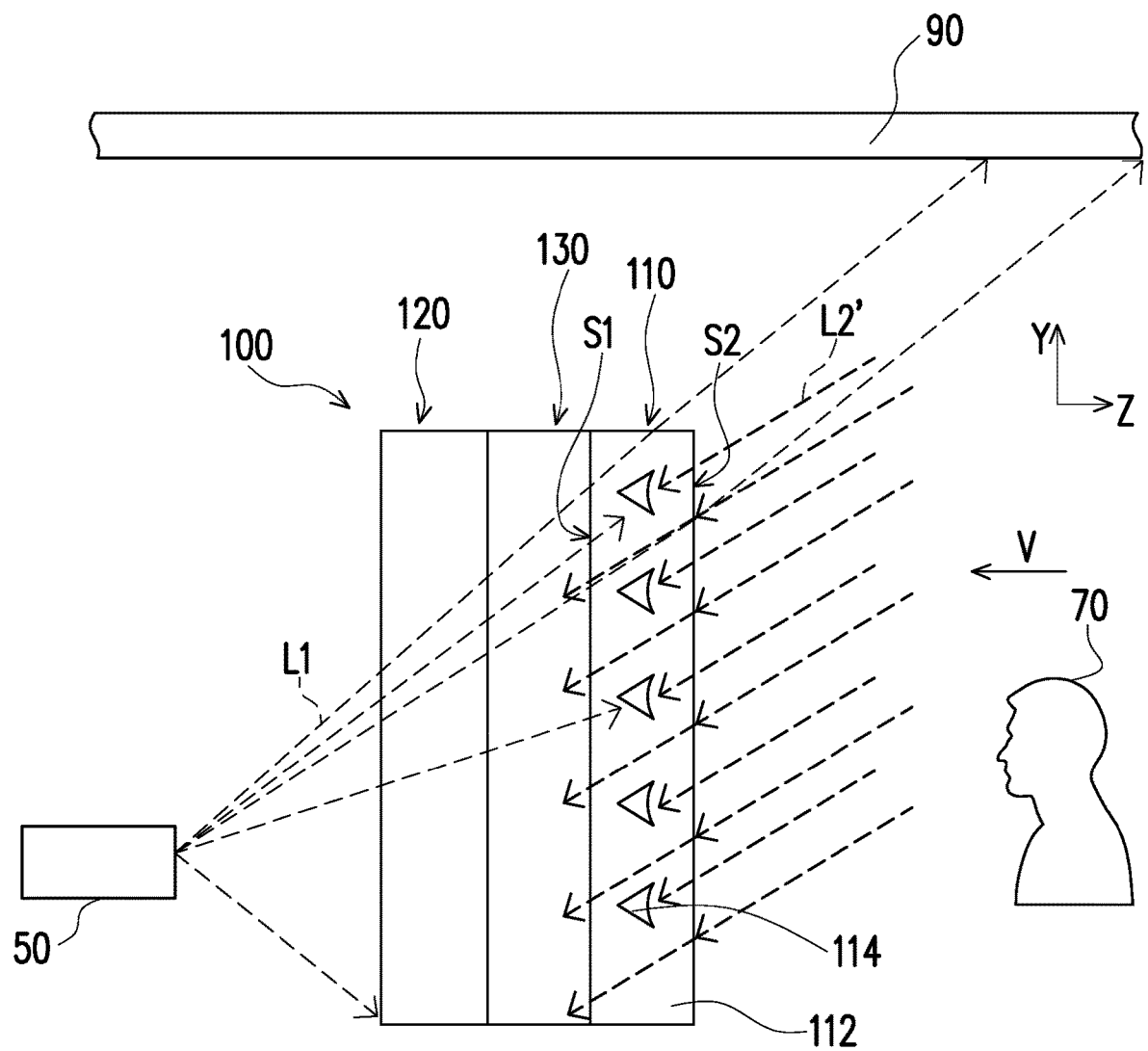
FIG. 5 is a schematic diagram of a projection screen according to an embodiment of the invention.

FIG. 5 is a schematic diagram of a projection screen according to an embodiment of the invention. Different to the embodiment of FIG. 1 where the projection film 120 is applied to the glass 60 of the exhibition window, the projection screen 100 of FIG. 5 is applied indoors. Namely, the environmental light L2' in FIG. 5 is, for example, a light emitted by an indoor light source, and the environment light L2 in FIG. 1 is, for example, a light emitted by an outdoor light source (for example, the sunlight). In the embodiment, the projection screen 100 further includes a transparent substrate 130, and the transparent layer 112 and the projection film 120 are respectively connected to two opposite sides of the transparent substrate 130. To be specific, in the embodiment of FIG. 5, one surface (for example, a left surface) of the transparent layer 112 is attached to one side (for example, a right side) of the transparent substrate 130, and one surface (for example, a right surface) of the projection film 120 is attached to another side (for example, a left side) of the transparent substrate 130. However, in an embodiment that is not illustrated, the projection screen may not have the transparent substrate, which is not limited by the invention.

In the embodiment, it is known that the light absorbing film 110 may absorb the environmental light L2', so as to avoid the situation that image contrast and clarity of the image projected on the projection film 120 are decreased due to the environmental light L2'. Moreover, as shown in FIG. 5, if the projection light L1 emitted by the rear projection projector 50 irradiates a ceiling 90, the light absorbing microstructures 114 in the light absorbing film 110 may absorb a part of the projection light L1 to greatly reduce a ghost image phenomenon caused by the projection light L1 on the ceiling 90.

Figure 6:
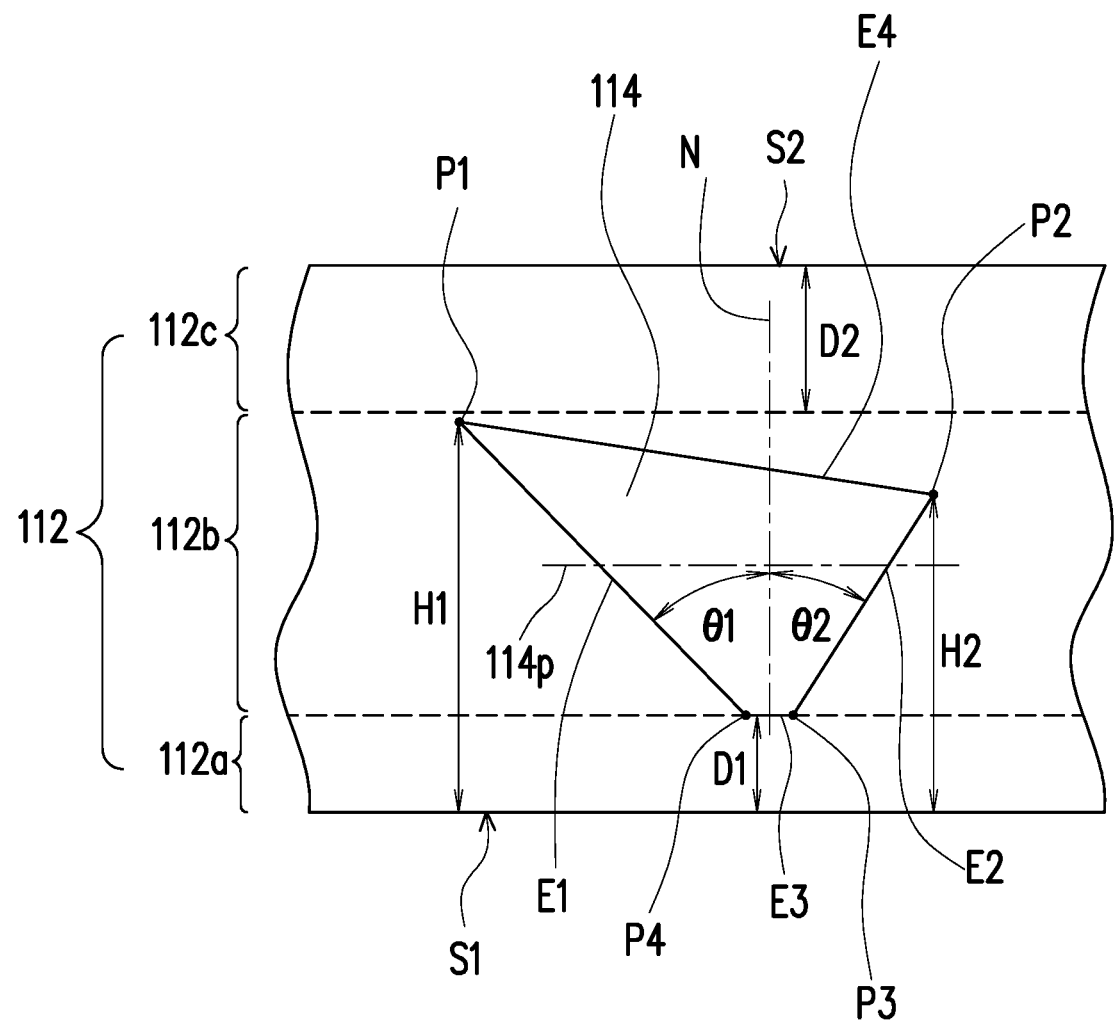
FIG. 6 is a partial schematic diagram of a light absorbing film according to another embodiment of the invention.
Figure 7A:
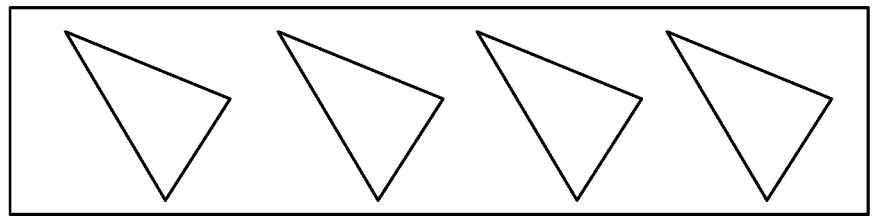
FIGS. 7A-7F are partial schematic diagrams of light absorbing films of six embodiments of the invention.
Figure 7B:
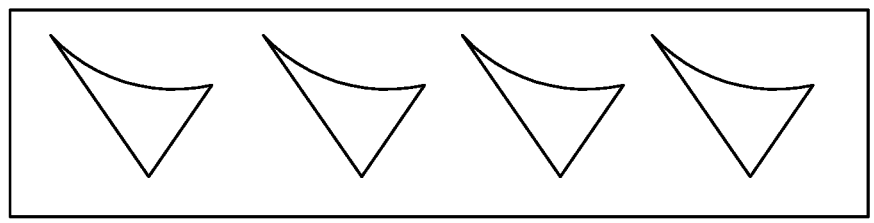
Figure 7C:
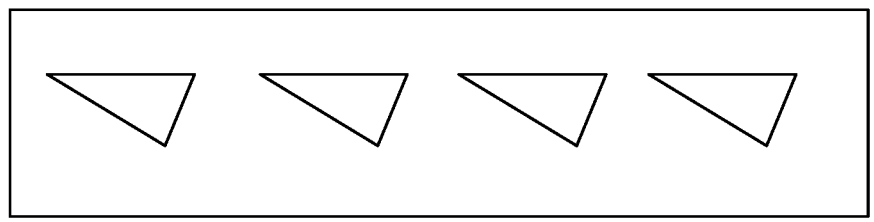
Figure 7D:
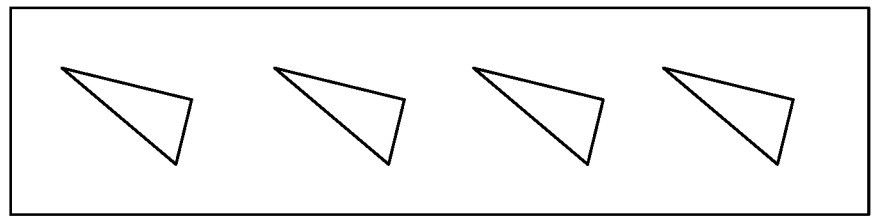
Figure 7E:
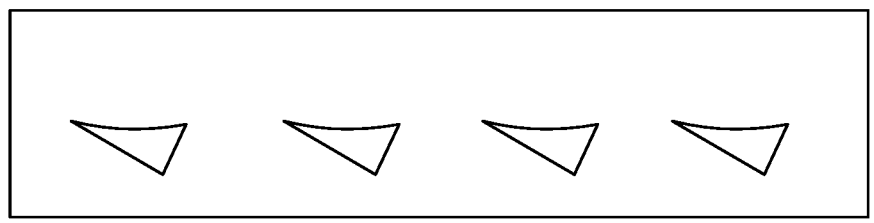
Figure 7F:
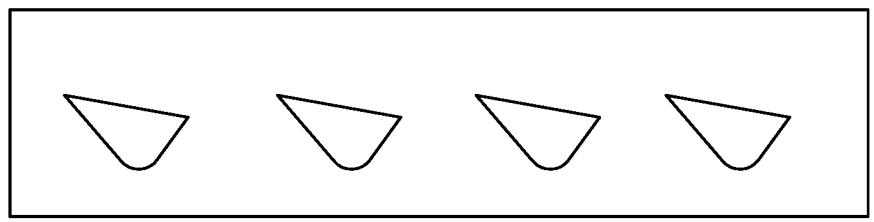

FIG. 6 is a partial schematic diagram of a light absorbing film according to another embodiment of the invention. As shown in FIG. 6, in the embodiment, a distance H1 between the first surface S1 of the transparent layer 112 and a vertex P1 of the light absorbing microstructure 114 is greater than a distance H2 between the first surface S1 of the transparent layer 112 and a vertex P2 of the light absorbing microstructure 114, an included angle θ1 between a side E1 of the light absorbing microstructure 114 and a reference line N perpendicular to the first surface S1 is greater than an included angle θ2 between a side E2 of the light absorbing microstructure 114 and the reference line N, the sides E1, E2, E3, E4 of the light absorbing microstructure 114 are all straight lines, and a vertex P3 and a vertex P4 of the light absorbing microstructure 114 are not a common point, though the invention is not limited thereto. In other embodiment, the distance H1 may be less than or equal to the distance H2, the included angle θ1 may be less than or equal to the included angle θ2, the sides E1, E2, E3 and/or E4 may be curved lines, and the vertex P3 and the vertex P4 may be a common point, which is not limited by the invention. In an embodiment, a minimum distance D1 between the first surface S1 of the transparent layer 112 and the light absorbing microstructure 114 may be 3 μm, a minimum distance D2 between the second surface S2 of the transparent layer 112 and the light absorbing microstructure 114 may be 3 μm, though the invention is not limited thereto. According to the above description, it is known that the light absorbing microstructure 114 may be any shape asymmetrical to the reference plane 114p, as shown in FIGS. 7A-7F. Since the light absorbing microstructures 114 may have a plurality of patterns, the light absorbing microstructures 114 may be formed in response to various demands in manufacturing/design, which avails decreasing process complexity and manufacturing cost, and improving generality of the light absorbing microstructures 114.

In summary, the embodiments of the invention have at least one of the following advantages or effects. The light absorbing microstructures embedded in the transparent layer are adapted to absorb the environmental light to avoid a situation that an image contrast and clarity of an image projected on the projection screen are decreased due to the environmental light. Moreover, the light absorbing microstructures are embedded in the transparent layer other than being disposed on the surface of the transparent layer, and there is a space between each of the light absorbing microstructures and each of the surfaces of the transparent layer, so that an excessive difference between refractive indexes of a light incident side and a light emitting side of the light absorbing film due to configuration of the light absorbing microstructures is avoided, so as to maintain the quality of a projection image. Moreover, the light absorbing microstructures are arranged at intervals without being comprehensively configured, such that the light absorbing microstructures are avoided to excessively absorb the projection light, and the situation that the light absorbing microstructures worsen the transparency of the projection screen is avoided. In overall, in the embodiments of the invention, the projection screen and the light absorbing film may greatly mitigate the influence of the environmental light without sacrificing the projection light, and the projection screen and the light absorbing film still have high transparency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection screen, comprising:
  a light absorbing film, comprising:
    a transparent layer, wherein the transparent layer comprises a first block, a second block and a third block; and
    a plurality of light absorbing microstructures, embedded in the transparent layer and arranged at intervals, wherein each of the light absorbing microstructures is asymmetrical to a reference plane, the transparent layer has two surfaces opposite to each other, and the reference plane passes through a geometric center of each of the light absorbing microstructures and is parallel to each of the surfaces, and there is a space between each of the light absorbing microstructures and each of the surfaces,
    wherein the two surfaces opposite to each other are respectively a first surface and a second surface, the first block is located between the first surface and the second block, the third block is located between the second block and the second surface, the light absorbing microstructures are embedded in the second block, and a difference between a refractive index of the first block and a refractive index of the third block is less than or equal to 0.1; and
  a projection film, wherein the projection film and the light absorbing film are stacked on each other.

2. The projection screen as claimed in claim 1, wherein the projection screen is adapted to a rear projection projector, wherein the projection film is located between the light absorbing film and the rear projection projector.

3. The projection screen as claimed in claim 1, further comprising a transparent substrate, wherein the transparent layer and the projection film are respectively connected to two opposite sides of the transparent substrate.

4. The projection screen as claimed in claim 1, wherein each of the light absorbing microstructures has a black color.

5. The projection screen as claimed in claim 1, wherein a light transmittance of the light absorbing film is greater than or equal to 50%.

6. The projection screen as claimed in claim 1, wherein each of the light absorbing microstructures has a first end and a second end opposite to each other, the first end faces the projection film, and a width of the first end is less than a width of the second end.

7. The projection screen as claimed in claim 1, wherein a material of each of the light absorbing microstructures is polymer.

8. The projection screen as claimed in claim 1, wherein a width of each of the light absorbing microstructures is greater than or equal to 5 μm.

9. The projection screen as claimed in claim 1, wherein a distance between adjacent two light absorbing microstructures is greater than or equal to 0.5 times a width of each of the light absorbing microstructures.

10. A light absorbing film, comprising:
   a transparent layer, wherein the transparent layer comprises a first block, a second block and a third block; and
   a plurality of light absorbing microstnictures, embedded in the transparent layer and arranged at intervals, wherein each of the light absorbing microstructures is asymmetrical to a reference plane, the transparent layer has two surfaces opposite to each other, the reference plane passes through a geometric center of each of the light absorbing microstructures and is parallel to each of the surfaces, and there is a space between each of the light absorbing microstructures and each of the surfaces,
   wherein the two surfaces opposite to each other are respectively a first surface and a second surface, the first block is located between the first surface and the second block, the third block is located between the second block and the second surface, the light absorbing microstructures are embedded in the second block, and a difference between a refractive index of the first block and a refractive index of the third block is less than or equal to 0.1.

11. The light absorbing film as claimed in claim 10, wherein the light absorbing film is adapted to a rear projection projector and a projection film, wherein the projection film and the light absorbing film are stacked on each other, and the projection film is located between the light absorbing film and the rear projection projector.

12. The light absorbing film as claimed in claim 10, further comprising a transparent substrate, wherein the transparent layer and the light absorbing film are respectively connected to two opposite sides of the transparent substrate.

13. The light absorbing film as claimed in claim 10, wherein each of the light absorbing microstructures has a black color.

14. The light absorbing film as claimed in claim 10, wherein a light transmittance of the light absorbing film is greater than or equal to 50%.

15. The light absorbing film as claimed in claim 10, wherein each of the light absorbing microstructures has a first end and a second end opposite to each other, the first end faces the projection film, and a width of the first end is less than a width of the second end.

16. The light absorbing film as claimed in claim 10, wherein a material of each of the light absorbing microstructures is polymer.

17. The light absorbing film as claimed in claim 10, wherein a width of each of the light absorbing microstructures is greater than or equal to 5 μm.

18. The light absorbing film as claimed in claim 10, wherein a distance between adjacent two light absorbing microstructures is greater than or equal to 0.5 times a width of each of the light absorbing microstructures.

* * * * *